United States Patent
Min et al.

(10) Patent No.: US 10,445,850 B2
(45) Date of Patent: Oct. 15, 2019

(54) TECHNOLOGIES FOR OFFLOADING NETWORK PACKET PROCESSING TO A GPU

(71) Applicant: Intel Corporation, Santa Clara, CA (US)

(72) Inventors: Alexander W. Min, Portland, OR (US);
Shinae Woo, Portland, OR (US);
Jr-Shian Tsai, Portland, OR (US);
Janet Tseng, Portland, OR (US);
Tsung-Yuan C. Tai, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 53 days.

(21) Appl. No.: 14/836,142

(22) Filed: Aug. 26, 2015

(65) Prior Publication Data

US 2017/0061566 A1  Mar. 2, 2017

(51) Int. Cl.
*G06T 1/20* (2006.01)
*H04L 12/26* (2006.01)
(Continued)

(52) U.S. Cl.
CPC ............ *G06T 1/20* (2013.01); *H04L 43/0817* (2013.01); *H04L 43/0876* (2013.01);
(Continued)

(58) Field of Classification Search
CPC ....... G09G 5/363; G06F 9/5044; G06F 9/505; G06F 17/30519; G06F 2209/509;
(Continued)

(56) References Cited

U.S. PATENT DOCUMENTS 7,372,465 B1   5/2008  Tamasi
7,466,316 B1 * 12/2008  Alben .................. G06F 9/5044
                                           345/501

(Continued)

FOREIGN PATENT DOCUMENTS

WO    2014-166758    10/2014

OTHER PUBLICATIONS

Kim et al., GPUnet: Networking Abstractions for GPU Programs, Oct. 8, 2014, 11th USENIX Symposium on Operating Systems Design and Implementation.*

(Continued)

*Primary Examiner* — Eric Nowlin
(74) *Attorney, Agent, or Firm* — Barnes & Thornburg LLP

(57) ABSTRACT

Technologies for offloading an application for processing a network packet to a graphics processing unit (GPU) of a network device. The network device is configured to determine resource criteria of the application and available resources of the GPU. The network device is further configured to determine whether the available GPU resources are sufficient to process the application based on the resource criteria of the application and the available GPU resources. Additionally, the network device is configured to determine one or more estimated GPU performance metrics based on the resource criteria of the application and the available GPU resources to determine whether to offload the application to the GPU. Other embodiments are described and claimed.

25 Claims, 6 Drawing Sheets

(51) Int. Cl.
*H04L 12/911* (2013.01)
*H04L 12/931* (2013.01)
*H04L 29/08* (2006.01)
*H04L 12/933* (2013.01)

(52) U.S. Cl.
CPC ............ *H04L 47/822* (2013.01); *H04L 49/10* (2013.01); *H04L 49/45* (2013.01); *H04L 67/1097* (2013.01)

(58) Field of Classification Search
CPC ....... G06F 9/5083; G06F 9/5088; G06T 1/20; G06T 2210/52; H04L 43/0876; H04L 47/726; H04L 47/822; H04L 49/45; H04L 67/1097
See application file for complete search history.

(56) References Cited

U.S. PATENT DOCUMENTS

| | | | |
|---|---|---|---|
| 7,860,999 B1 | 12/2010 | Subramanian | |
| 8,284,205 B2* | 10/2012 | Miller | G06F 1/3203 345/501 |
| 8,803,892 B2* | 8/2014 | Urbach | G06F 9/5016 345/505 |
| 8,878,864 B2* | 11/2014 | Baxter | G06T 15/005 345/552 |
| 9,311,157 B2* | 4/2016 | Kim | G06F 9/5066 |
| 9,660,928 B2* | 5/2017 | Urbach | G06F 9/5016 |
| 10,073,783 B2* | 9/2018 | Clifton | G06F 12/0848 |
| 10,228,972 B2* | 3/2019 | Hushchyn | G06F 9/4893 |
| 10,303,522 B2* | 5/2019 | Zhou | G06F 9/5083 |
| 2006/0221086 A1* | 10/2006 | Diard | G06T 15/005 345/505 |
| 2006/0242710 A1* | 10/2006 | Alexander | G09G 5/363 726/24 |
| 2008/0030508 A1* | 2/2008 | Herz | G06F 3/14 345/502 |
| 2009/0027403 A1 | 1/2009 | Jung | |
| 2009/0109230 A1* | 4/2009 | Miller | G06F 1/3203 345/506 |
| 2010/0245366 A1* | 9/2010 | Nath | G06F 15/177 345/502 |
| 2011/0050713 A1* | 3/2011 | McCrary | G06F 9/3851 345/522 |
| 2011/0063307 A1 | 4/2011 | Alexander | |
| 2011/0213947 A1* | 9/2011 | Mathieson | G06F 1/206 712/16 |
| 2011/0304634 A1* | 12/2011 | Urbach | G06F 9/5016 345/501 |
| 2012/0079498 A1* | 3/2012 | Kim | G06F 9/5066 718/104 |
| 2012/0149464 A1* | 6/2012 | Bone | G06F 9/5044 463/30 |
| 2012/0169742 A1* | 7/2012 | Baxter | G06T 15/005 345/501 |
| 2012/0192200 A1* | 7/2012 | Rao | G06F 9/4893 718/105 |
| 2013/0093779 A1* | 4/2013 | Lyons | G09G 5/39 345/547 |
| 2013/0117305 A1* | 5/2013 | Varakin | G06F 9/5072 707/769 |
| 2013/0160016 A1* | 6/2013 | Gummaraju | G06F 9/5044 718/102 |
| 2013/0332937 A1* | 12/2013 | Gaster | G06F 9/50 718/104 |
| 2014/0033207 A1* | 1/2014 | Sharma | G06F 11/3072 718/100 |
| 2014/0052965 A1* | 2/2014 | Sarel | G06F 1/329 712/214 |
| 2014/0189708 A1* | 7/2014 | Lee | G06F 9/5027 718/104 |
| 2014/0325073 A1* | 10/2014 | Urbach | G06F 9/5016 709/226 |
| 2015/0062133 A1* | 3/2015 | Baxter | G06T 15/005 345/501 |
| 2015/0091922 A1* | 4/2015 | Nash | G06T 1/20 345/522 |
| 2015/0116340 A1* | 4/2015 | Nagai | G06F 17/30442 345/531 |
| 2015/0199214 A1* | 7/2015 | Lee | G06F 9/505 718/102 |
| 2015/0317762 A1* | 11/2015 | Park | G06T 1/20 345/505 |
| 2017/0004808 A1* | 1/2017 | Agashe | G09G 5/363 |
| 2017/0010923 A1* | 1/2017 | Verma | G06F 17/30424 |
| 2017/0228849 A1* | 8/2017 | Huang | H04N 21/4436 |
| 2017/0255496 A1* | 9/2017 | Deng | G06F 9/4881 |
| 2018/0052709 A1* | 2/2018 | Fong | G06F 9/5044 |
| 2018/0108109 A1* | 4/2018 | Zhan | G06F 9/5038 |
| 2018/0143907 A1* | 5/2018 | Clifton | G06F 12/0848 |
| 2018/0276044 A1* | 9/2018 | Fong | G06F 9/5044 |
| 2018/0332252 A1* | 11/2018 | Wang | G09G 5/005 |
| 2018/0349146 A1* | 12/2018 | Iwamoto | G06F 9/4881 |
| 2018/0373564 A1* | 12/2018 | Hushchyn | G06F 9/4893 |
| 2019/0004868 A1* | 1/2019 | Zhou | G06F 9/5083 |
| 2019/0098039 A1* | 3/2019 | Gates | G16H 50/20 |
| 2019/0129757 A1* | 5/2019 | Chen | G06F 9/5011 |
| 2019/0132257 A1* | 5/2019 | Zhao | H04L 47/803 |
| 2019/0146842 A1* | 5/2019 | Zeng | G06F 9/50 |

OTHER PUBLICATIONS

Lee et al., Fast Forwarding Table Lookup Exploiting GPU Memory Architecture, Nov. 19, 2010, IEEE, 2010 International Conference on Information and Communication Technology Convergence (ICTC).*
Mu et al., IP Routing Processing with Graphic Processors, Mar. 12, 2010, IEEE, 2010 Design, Automation & Test in Europe Conference & Exhibition (DATE).*
Vasiliadis et al., Gnort: High Performance Network Intrusion Detection Using Graphics Processors, 2008, Springer, Recent Advances in Intrusion Detection. RAID 2008. Lecture Notes in Computer Science, vol. 5230, pp. 116-134.*
Han et al., PacketShader: a GPU-Accelerated Software Router, Sep. 3, 2010, SIGCOMM.*
International Search Report for PCT/US16/044012, dated Oct. 21, 2016 (3 pages).
Written Opinion for PCT/US16/044012, dated Oct. 21, 2016 (6 pages).

* cited by examiner

US 10,445,850 B2

TECHNOLOGIES FOR OFFLOADING NETWORK PACKET PROCESSING TO A GPU

BACKGROUND

With the technological advancements of server, network, and storage technologies, hardware-based network functions are being transitioned to software-based network functions on standard high-volume servers. To meet the performance requirements, software-based network functions typically require more central processor unit (CPU) cycles, as compared to their hardware-based counterparts. Alternatively, general purpose graphics processor units (GPUs), or GPGPUs, may be used for network packet processing workloads. The GPGPU performance of a single network packet processing application (e.g., a deep packet inspection (DPI), a firewall, encryption/decryption, layer-3 forwarding, etc.), having exclusive access to a GPGPU is relatively predictable. However, a level of performance can become more difficult to predict as additional network packet processing applications utilize the GPGPU as an offloading engine or an accelerator. For example, a GPGPU-accelerated application may not be aware of and/or may not be able to communicate with another GPGPU-accelerated application, which can result in inefficient and/or uncoordinated usage of the GPGPU. More specifically, if the first GPGPU-accelerated application is fully utilizing resources of the GPGPU, offloading the second GPGPU-accelerated application may result in performance degradation due to resource contention, etc.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
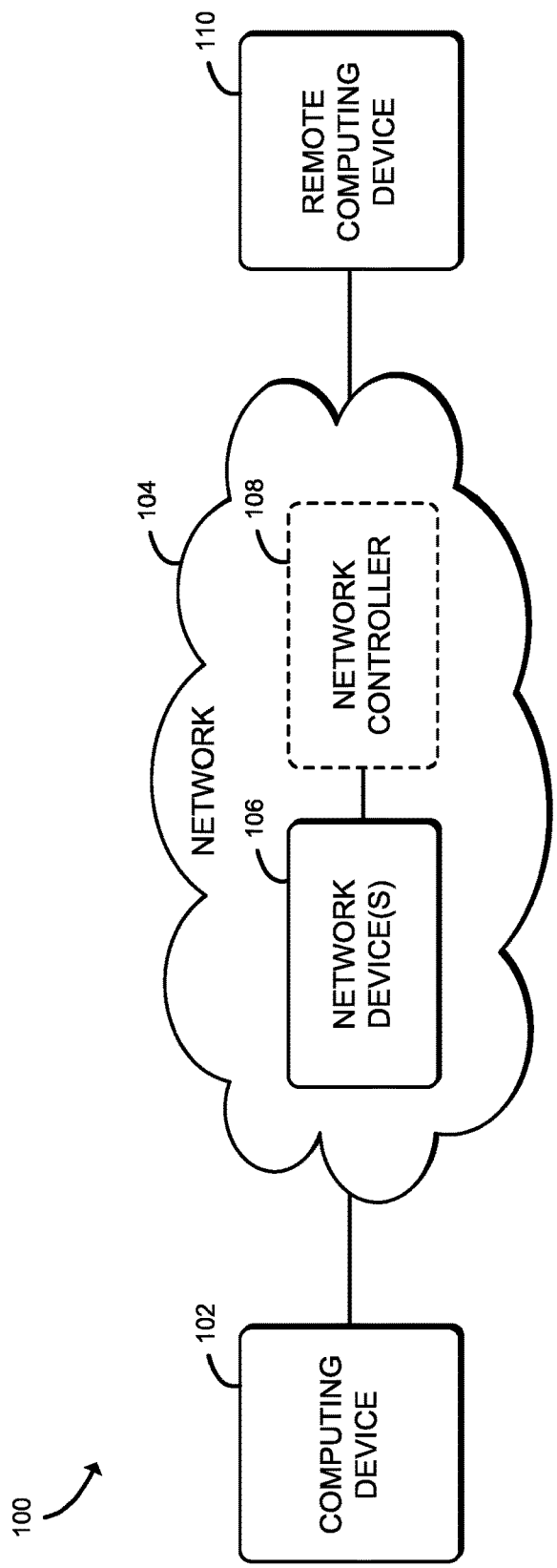
FIG. 1 is a simplified block diagram of at least one embodiment of a system that includes a network device for offloading network packet processing to a graphics processing unit (GPU) of the network device.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for offloading network packet processing to a graphics processing unit (GPU) includes a computing device 102 and a remote computing device 110 in communication over a network 104 via one or more network devices 106. In use, the network device 106 facilitates the transmission of network packets (e.g., based on workload type, flow information, etc.) between the computing device 102 and the remote computing device 110 over the network 104. For example, the computing device 102 may request data from the remote computing device 110 by sending one or more network packets that indicate the computing device 102 is requesting data from the remote computing device 110. In response to the request, the remote computing device 110 may attempt to transmit response data (e.g., a payload, a message body, etc.) via one or more network packets to the computing device 102 across the network 104.

Typically, the network packets are processed by the network devices 106 prior to being forwarded along. For example, a network device 106 may allocate a number of computing resources for one or more virtual machines (VMs) to perform various network functions or services (e.g., firewall services, network address translation (NAT) services, load-balancing services, deep packet inspection (DPI) services, transmission control protocol (TCP) optimization services, 4G/LTE network services, etc.) on the network packets. Based on the various network functions or services that the network device 106 has allocated, the network device 106 can process each network packet, such as to determine where to route the network packets, whether the network packets should be dropped, etc. To do so, one or more of the VMs may be configured to perform a particular service that can be used to process the network packets.

Figure 2:
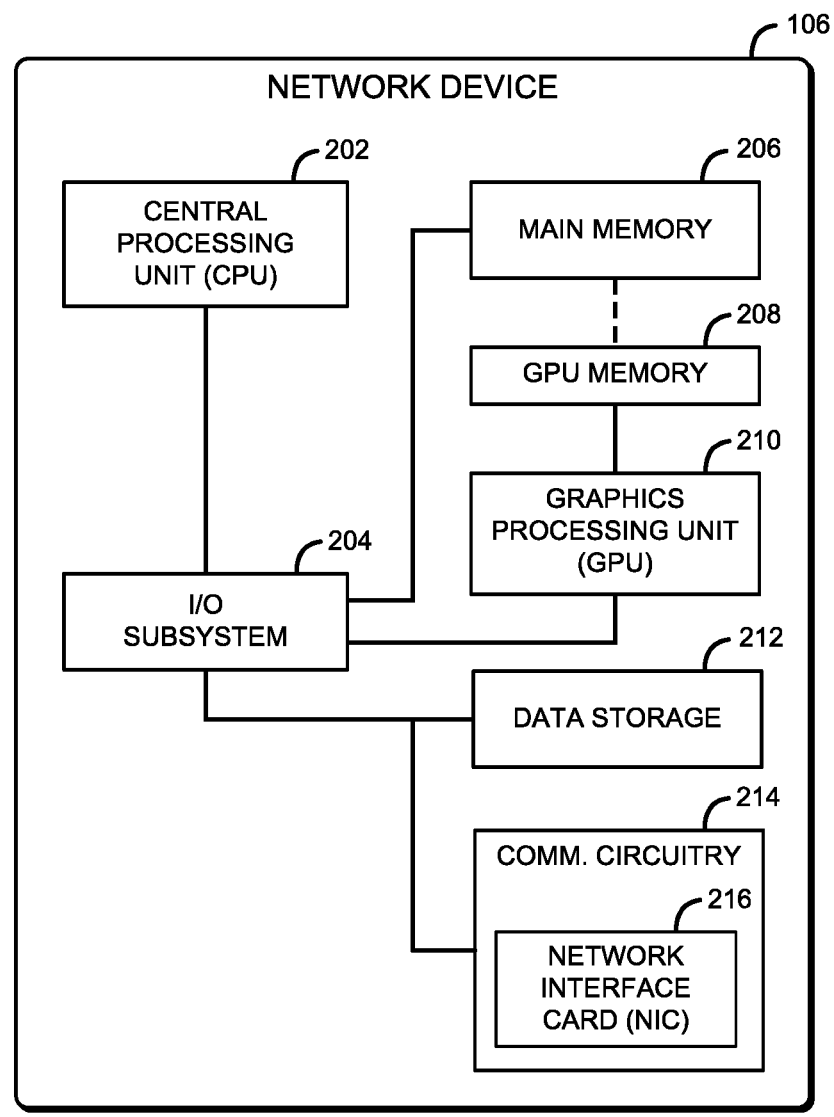
FIG. 2 is a simplified block diagram of at least one embodiment of the network device of the system of FIG. 1.

Each VM may perform the relevant processing of the network packets based on the service for which they were configured using a graphics processing unit (GPU) of the network device 106 (see, e.g., the GPU 210 of FIG. 2) or a central processing unit (CPU) of the network device 106 (see, e.g., the CPU 202 of FIG. 2). In use, the network device 106 estimates an impact on a performance metric (e.g., a level of performance) for each of the CPU and GPU to determine whether to perform the service (i.e., the portion of the processing for which that particular VM is configured) on the network packets at either the CPU or the GPU. In other words, the network device 106 estimates how the CPU might perform if the processing were to be performed on the CPU and how the GPU might perform if the processing were to be performed on the GPU. Based on the performance metric estimations, the network device 106 can then determine whether to perform the service on the CPU or the GPU.

The computing device 102 may be embodied as any type of computation or computing device capable of performing the functions described herein, including, without limitation, a computer, a desktop computer, a smartphone, a workstation, a laptop computer, a notebook computer, a tablet computer, a mobile computing device, a wearable computing device, a network appliance, a web appliance, a distributed computing system, a processor-based system, and/or a consumer electronic device. Similarly, the remote computing device 110 may be embodied as any type of computation or computing device capable of performing the functions described herein, including, without limitation, a computer, a desktop computer, a smartphone, a workstation, a laptop computer, a notebook computer, a tablet computer, a mobile computing device, a wearable computing device, a network appliance, a web appliance, a distributed computing system, a processor-based system, and/or a consumer electronic device. Each of the computing device 102 and the remote computing device 110 may include components commonly found in a computing device such as a processor, memory, input/output subsystem, data storage, communication circuitry, etc.

The network 104 may be embodied as any type of wired or wireless communication network, including cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), telephony networks, local area networks (LANs) or wide area networks (WANs), global networks (e.g., the Internet), or any combination thereof. Additionally, the network 104 may include any number of network devices 106 as needed to facilitate communication between the computing device 102 and the remote computing device 110.

In some embodiments, the network device 106 may additionally be connected to a network controller 108. The network controller 108 may be embodied as, or otherwise include, any type of hardware, software, and/or firmware capable of providing a platform for performing the functions described herein, such a computing device, a multiprocessor system, a server (e.g., stand-alone, rack-mounted, blade, etc.), a network appliance, a compute device, etc. In some embodiments, the network controller 108 may be configured to store and/or maintain topology information of the network 104 (i.e., the arrangement and interconnectivity of the network devices 106) and/or network packet management information (e.g., network packet/flow management/processing information, policies corresponding to network packet types/flows, etc.). For example, the network controller 108 may be configured to function as a software-defined networking (SDN) controller, a network functions virtualization (NFV) management and orchestration (MANO), etc. Accordingly, the network controller 108 may send (e.g., transmit, etc.) network flow information (e.g., network packet/flow policies) to the network devices 106 capable of operating in an SDN environment and/or a NFV environment.

The network device 106 may be embodied as any type of computing device capable of facilitating wired and/or wireless network communications between the computing device 102 and the remote computing device 110. For example, the network device 106 may be embodied as a computing device, an access point, a router, a switch, a network hub, a storage device, a compute device, a multiprocessor system, a server (e.g., stand-alone, rack-mounted, blade, etc.), a network appliance (e.g., physical or virtual), etc. As shown in FIG. 2, an illustrative network device 106 includes a central processing unit (CPU) 202, an input/output (I/O) subsystem 204, a main memory 206, a GPU memory 208, a GPU 210, a data storage device 212, and communication circuitry 214 that includes a network interface card (NIC) 216. Of course, in other embodiments, the network device 106 may include other or additional components, such as those commonly found in a network device (e.g., virtualization services, drivers, operating systems, schedulers, etc.). Additionally, in some embodiments, one or more of the illustrative components may be incorporated in, or otherwise form a portion of, another component. For example, in some embodiments, the main memory 206, or portions thereof, may be incorporated in the CPU 202 and/or the GPU memory 208 may be incorporated in the GPU 210, in some embodiments. Additionally or alternatively, in some embodiments, the GPU memory 208, or portions thereof, may be a part of the main memory 206 (e.g., integrated graphics such as Intel® Processor Graphics).

The CPU 202 may be embodied as any type of processor capable of performing the functions described herein. The CPU 202 may be embodied as a single or multi-core processor(s), digital signal processor, microcontroller, or other processor or processing/controlling circuit. The I/O subsystem 204 may be embodied as circuitry and/or components to facilitate input/output operations with the CPU 202, the main memory 206, the GPU 210, the GPU memory 208, and other components of the network device 106. For example, the I/O subsystem 204 may be embodied as, or otherwise include, memory controller hubs, input/output control hubs, integrated sensor hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 204 may form a portion of a system-on-a-chip (SoC) and be incorporated, along with the CPU 202, the GPU 210, the GPU memory 208, the main memory 206, and other components of the network device 106, on a single integrated circuit chip.

The GPU 210 illustratively includes an array of processor cores or parallel processors, each of which can execute a number of parallel and concurrent threads to handle specific types of GPU tasks. For example, in some embodiments, the processor cores of the GPU 210 may be configured to individually handle 3D rendering tasks, blitter (e.g., 2D graphics), video, and video encoding/decoding tasks, by providing electronic circuitry that can perform mathematical operations rapidly using extensive parallelism and many concurrent threads. Additionally or alternatively, the GPU 210 is generally capable of parallelizing network packet processing (e.g., internet protocol (IP) forwarding, hashing, pattern matching, etc.) via the processor cores of the GPU 210. Accordingly, the GPU 210 can be an alternative to the CPU 202 (i.e., the CPU) for performing at least a portion of the processing of the network packet.

Using the GPU 210 can free up resources of the CPU 202 (e.g., memory, cache, processor cores, communication bus bandwidth, etc.), which can be dedicated to other tasks, such as application performance management. For ease of discussion, "graphics processing unit" or "GPU" may be used herein to refer to, among other things, a graphics processing unit, a graphics accelerator, or other type of specialized electronic circuit or device, such as a general purpose GPU (GPGPU) or any other device or circuit that is configured to be used by the network device 106 to accelerate network packet processing tasks and/or perform other parallel computing operations that would benefit from accelerated processing, such as network traffic monitoring. It should be appreciated that, in some embodiments, the GPU 210 may be embodied as a peripheral device (e.g., on a discrete graphics card), or may be located on the CPU 202 motherboard or on the CPU 202 die.

The GPU memory 208 (e.g., integrated graphics such as Intel® Processor Graphics) and the main memory 206 may be embodied as any type of volatile or non-volatile memory or data storage capable of performing the functions described herein. In operation, the main memory 206 may store various data and software used during operation of the network device 106, such as operating systems, applications, programs, libraries, and drivers. For example, portions of the main memory 206 may at least temporarily store command buffers and GPU commands that are created by the CPU 202, and portions of the GPU memory 208 may at least temporarily store the GPU commands received from the main memory 206 by, e.g., direct memory access (DMA). The GPU memory 208 is communicatively coupled to the GPU 210, and the main memory 206 is similarly communicatively coupled to the CPU 202 via the I/O subsystem 204. As described previously, in some embodiments, the GPU memory 208, or portions thereof, may be a part of the main memory 206, and both CPU 202 and GPU 210 may have access the GPU memory 208.

The data storage device 212 may be embodied as any type of device or devices configured for short-term or long-term storage of data such as, for example, memory devices and circuits, memory cards, hard disk drives, solid-state drives, or other data storage devices. The data storage device 212 may include a system partition that stores data and firmware code for the network device 106. The data storage device 212 may also include an operating system partition that stores data files and executables for an operating system of the network device 106.

The communication circuitry 214 may be embodied as any communication circuit, device, or collection thereof, capable of enabling communications over the network 104 between the network device 106 and the computing device 102, another network device 106, the network controller 108, and/or the remote computing device 110. The communication circuitry 214 may be configured to use any one or more communication technology (e.g., wired or wireless communications) and associated protocols (e.g., Ethernet, Bluetooth®, Wi-Fi®, WiMAX, etc.) to effect such communication.

The communication circuitry 214 additionally includes a network interface card (NIC) 216. The NIC 216 may connect the computing device 102, the remote computing device 110, and/or another network device 106 to one of the network devices 106. The NIC 216 may be embodied as one or more add-in-boards, daughtercards, network interface cards, controller chips, chipsets, or other devices that may be used by the network device 106. For example, the NIC 216 may be embodied as an expansion card coupled to the I/O subsystem 204 over an expansion bus, such as PCI Express.

Figure 3:
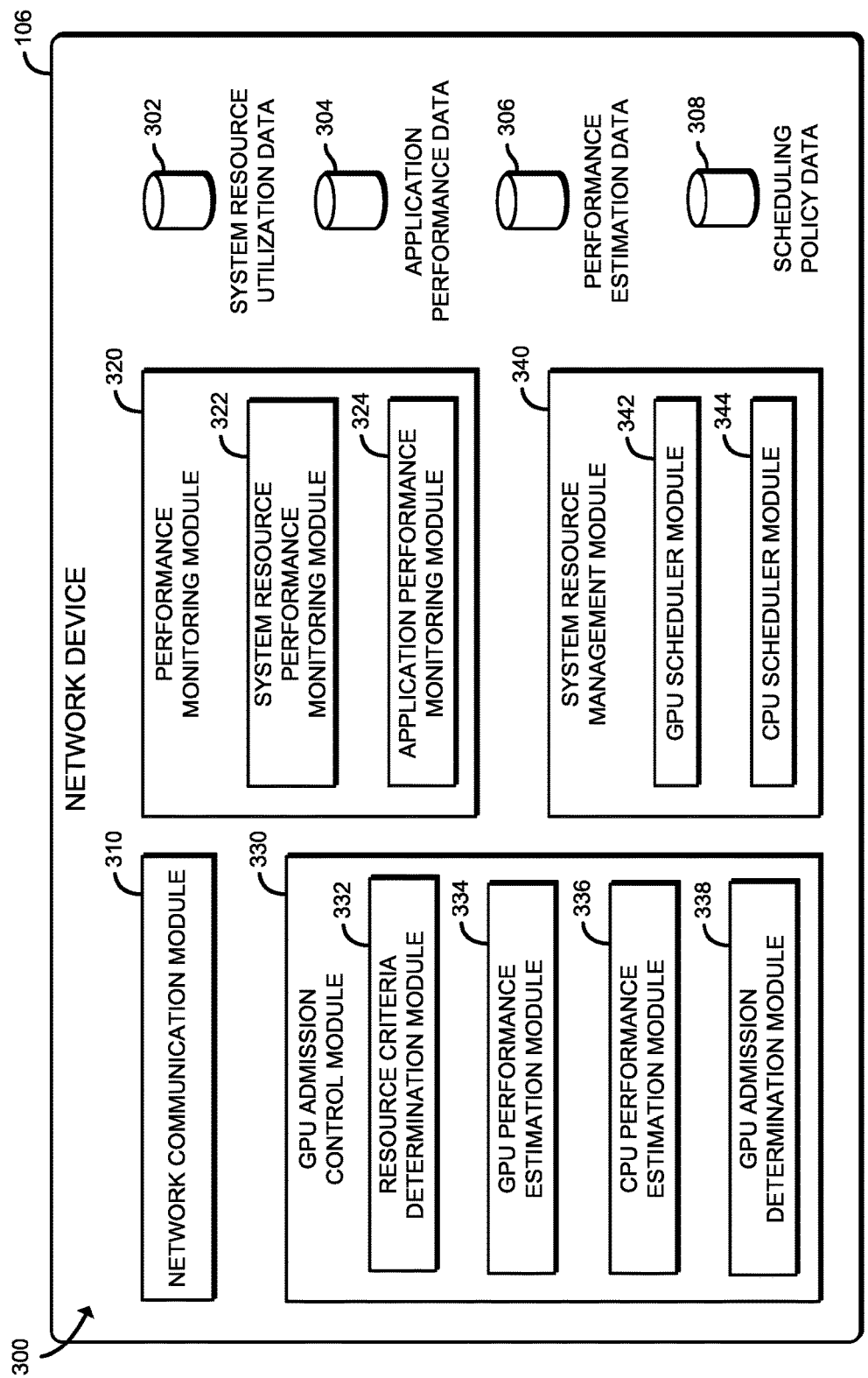
FIG. 3 is a simplified block diagram of at least one embodiment of an environment that may be established by the network device of FIG. 2.

Referring now to FIG. 3, in an embodiment, the network device 106 establishes an environment 300 during operation. The illustrative environment 300 includes a network communication module 310, a performance monitoring module 320, a GPU admission control module 330, and a system resource management module 340. Each of the modules, logic, and other components of the environment 300 may be embodied as hardware, software, firmware, or a combination thereof. For example, each of the modules, logic, and other components of the environment 300 may form a portion of, or otherwise be established by, the CPU 202 or other hardware components of the network device 106. As such, in some embodiments, one or more of the modules of the environment 300 may be embodied as circuitry or collection of electrical devices (e.g., network communication circuitry 310, GPU admission control circuitry 330, performance monitoring circuitry 320, system resource management circuitry 340, etc.). In the illustrative environment 300, the network device 106 includes system resource utilization data 302, application performance data 304, performance estimation data 306, and scheduling policy data 308, each of which may be accessed by the various modules and/or sub-modules of the network device 106. It should be appreciated that the network device 106 may include other components, sub-components, modules, sub-modules, and/or or devices commonly found in a network device, which are not illustrated in FIG. 3 for clarity of the description.

The network communication module 310 is configured to facilitate inbound and outbound network communications (e.g., network traffic, network packets, network flows, etc.) to and from the network device 106, respectively. To do so, the network communication module 310 is configured to receive and process network packets from one computing device (e.g., the computing device 102, another network device 106, the remote computing device 110) and to prepare and transmit network packets to another computing device (e.g., the computing device 102, another network device 106, the remote computing device 110). Accordingly, in some embodiments, at least a portion of the functionality of the network communication module 310 may be performed by the communication circuitry 214, and more specifically by the NIC 216.

The performance monitoring module 320 is configured to monitor one or more performance metrics of various physical and/or virtual resources of the network device 106. To do so, the illustrative performance monitoring module 320 includes a system resource performance monitoring module 322 and an application performance monitoring module 324. The system resource performance monitoring module 322 is configured to monitor various system resource performance metrics, or statistics, of the network device 106. The system resource performance metrics may include any data indicative of a utilization or other statistic of one or more physical or virtual components or available resources of the network device 106. For example, the system resource performance metrics may include such performance metrics as a CPU utilization, a GPU utilization, a memory utilization, cache hits/misses, a GPU thread occupancy, a cache miss rate, a translation lookaside buffer (TLB) miss, a page fault, etc. In some embodiments, to monitor various system resources of the network device 106, the system resource performance monitoring module 322 may be configured to periodically read hardware and/or software (e.g., an operating system (OS)) performance counters. Additionally, in some embodiments, the system resource performance metrics may be stored in the system resource utilization data 302.

The application performance monitoring module 324 is configured to monitor application performance metrics, or statistics, of the applications presently running on the network device 106. Such application performance metrics may include any data indicative of the operation or related performance of an application executed by the network device 106. For example, the application performance metrics may include such performance metrics as a throughput level, a cache usage, a memory usage, a packet processing delay, a number of transmitted/received packets, a packet loss/drop count or ratio, a latency level, a power consumption level, etc. In some embodiments, the application performance metrics may be stored in the application performance data 304. To monitor the application performance metrics, the application performance monitoring module 324 may be configured to interface with various VMs (e.g., of a service function chain) and/or applications capable of being executed by the network device 106, such as those applications configured to perform at least a portion of the processing of a received network packet.

In some embodiments, to monitor the application performance metrics of the applications presently running on the network device 106, the application performance monitoring module 324 may be configured to periodically read hardware and/or software (e.g., a virtual switch) performance counters. For example, in some embodiments, a shim layer between application processing interface (API) calls and a device driver can intercept the API calls. In another example, specially defined APIs may be used between the application and the application performance monitoring module 324.

The GPU admission control module 330 is configured to determine whether to admit a network packet processing application (e.g., firewall services, NAT services, load-balancing services, DPI services, TCP optimization services, 4G/LTE network services, etc.) to be scheduled for the GPU 210. To do so, the illustrative GPU admission control module 330 includes a resource criteria determination module 332, a GPU performance estimation module 334, a CPU performance estimation module 336, and a GPU admission determination module 338.

The resource criteria determination module 332 is configured to determine system resources required (i.e., resource criteria) to execute (i.e., run) an application (e.g., the network packet processing application). The resource criteria include any data that defines a performance requirement, such as a maximum latency, a minimum throughput, a minimum amount of one or more system resources of the network device required to run the application, an amount of available processing power, an amount of available memory, etc.

The GPU performance estimation module 334 is configured to determine one or more estimated performance metrics of the GPU 210 (i.e., estimated GPU performance metrics) based on the present state of the system resources of the network device 106 available to process a network packet and determine an impact on the performance metric if the application were to be scheduled for and processed by the GPU 210. To do so, the GPU performance estimation module 334 may receive or access, for example, the performance data generated by the system resource performance monitoring module 322 and/or the application performance monitoring module 324 that relate to the GPU 210. That is, the estimated GPU performance metrics may include any data indicative of an estimated utilization, operation, or other performance level metric of the GPU 210, if the GPU 210 were scheduled to run the application, taking into account a present workload of the GPU 210.

The CPU performance estimation module 336 is configured to estimate one or more estimated performance metrics of the CPU 202 (i.e., estimated CPU performance metrics) based on the present state of the system resources of the network device 106 available to process the network packet and determine an impact on the performance metric if the application were to be scheduled for and processed by the CPU 202. To do so, the CPU performance estimation module 336 may receive or access, for example, the performance data generated by the system resource performance monitoring module 322 and/or the application performance monitoring module 324 that relate to the CPU 202. That is, the estimated CPU performance metrics may include any data indicative of an estimated utilization, operation, or other performance level metric of the CPU 202, if the CPU 202 were scheduled to run the application, taking into account a present workload of the CPU 202.

The GPU admission determination module 338 is configured to determine whether a sufficient level of GPU resources exist to meet the system resource demand of the application (i.e., the resource criteria). To do so, the GPU admission determination module 338 may be configured to retrieve present GPU utilization statistics and compare the present GPU utilization statistics to the resource criteria.

The GPU admission determination module 338 is further configured to analyze the resource criteria of the application (e.g., as determined by resource criteria determination module 332) and the estimated performance metrics (e.g., as determined by the GPU performance estimation module 334 and/or the CPU performance estimation module 336) to determine whether to admit (i.e., run, schedule, etc.) the application for the GPU 210. In some embodiments, additional and/or alternative utilization statistics may be used to determine whether to run the application on the GPU 210 or the CPU 202, such as a number of applications running on the GPU, a maximum number of applications that may be run on the GPU, a maximum number of GPU cores to put in use at the same time, etc.

Additionally or alternatively, in some embodiments, one or more of the performance metrics may be weighted such that a particular performance metric is given more weight than another performance metric when determining whether to run the network processing application on the GPU 210 or the CPU 202. In some embodiments, additional and/or alternative analysis may be performed to determine whether to run the application on the GPU 210 or the CPU 202, such as a performance history of running like applications on the GPU 210, for example. In some embodiments, one or more of the estimated performance metrics determined by the GPU performance estimation module 334 and/or the CPU performance estimation module 336 may be stored in the performance estimation data 306.

The system resource management module 340 is configured to manage the allocation of system resource (e.g., computing resources, storage resources, network resources, etc.) of the network device 106 after receiving the network packet or performing another network processing function on the packet (e.g., in a service function chain). To do so, the system resource management module 340 may be capable of instantiating (i.e., creating) VMs, suspending VMs, shutting down (i.e., closing) VMs, and redirecting network traffic to either the GPU 210 or the CPU 202 for more efficient processing (e.g., is faster, is an improvement, a more efficient level of resource usage, etc.). In some embodiments, the "more efficient" processor may be determined by a GPU performance metric that is higher or lower than a CPU performance metric, depending on the particular performance metric being compared. For example, an improved throughput metric may be of a higher value while an improved latency may be of a lower value. Additionally, in some embodiments, the system resource allocation may be based on one or more scheduling policies including instructions on which network packets are permissible to schedule to the GPU 210. In such embodiments, the scheduling policies may be received from the network controller 108, for example, and/or stored in the scheduling policy data 308.

The illustrative system resource management module 340 includes a GPU scheduler module 342 and a CPU scheduler module 344. The GPU scheduler module 342 is configured to schedule processes (e.g., the network processing application) for execution by the GPU 210, such as may be triggered by receiving GPU commands issued by the GPU admission control module 330 (e.g., the GPU admission determination module 338 upon a determination that the GPU is to execute the network packet processing application). The GPU scheduler module 342 may select a scheduling policy from a number of possible scheduling policies (e.g., from the scheduling policy data 308), based on one or more attributes of the GPU commands, GPU command buffer dependencies, and/or other decision criteria, and schedules the GPU commands according to the selected scheduling policy. In use, the GPU scheduler module 342 communicates with the applications in the VMs to control the submission of GPU commands to the GPU 210.

It should be appreciated that, in embodiments wherein the application is scheduled to be run on the GPU 210, upon completion of the execution of the application, results of the execution (e.g., performance metrics of the GPU 210) may be stored in the application performance data 304 for future reference, such as by the performance monitoring module 320.

Similar to the GPU scheduler module 342, the CPU scheduler module 344 is configured to schedule processes (e.g., the network processing application) for execution by the CPU 202, such as after an event (e.g., running an application on an instantiated VM to process or otherwise perform a service on a network packet) or an interrupt. It should be appreciated that, in some embodiments, the CPU 202 may have one or more cores (e.g., a multi-core processor). In such embodiments the CPU scheduler module 344 may be further configured to schedule the process to a particular core of the CPU 202 based on available system resources of the network device 106.

Figure 4:
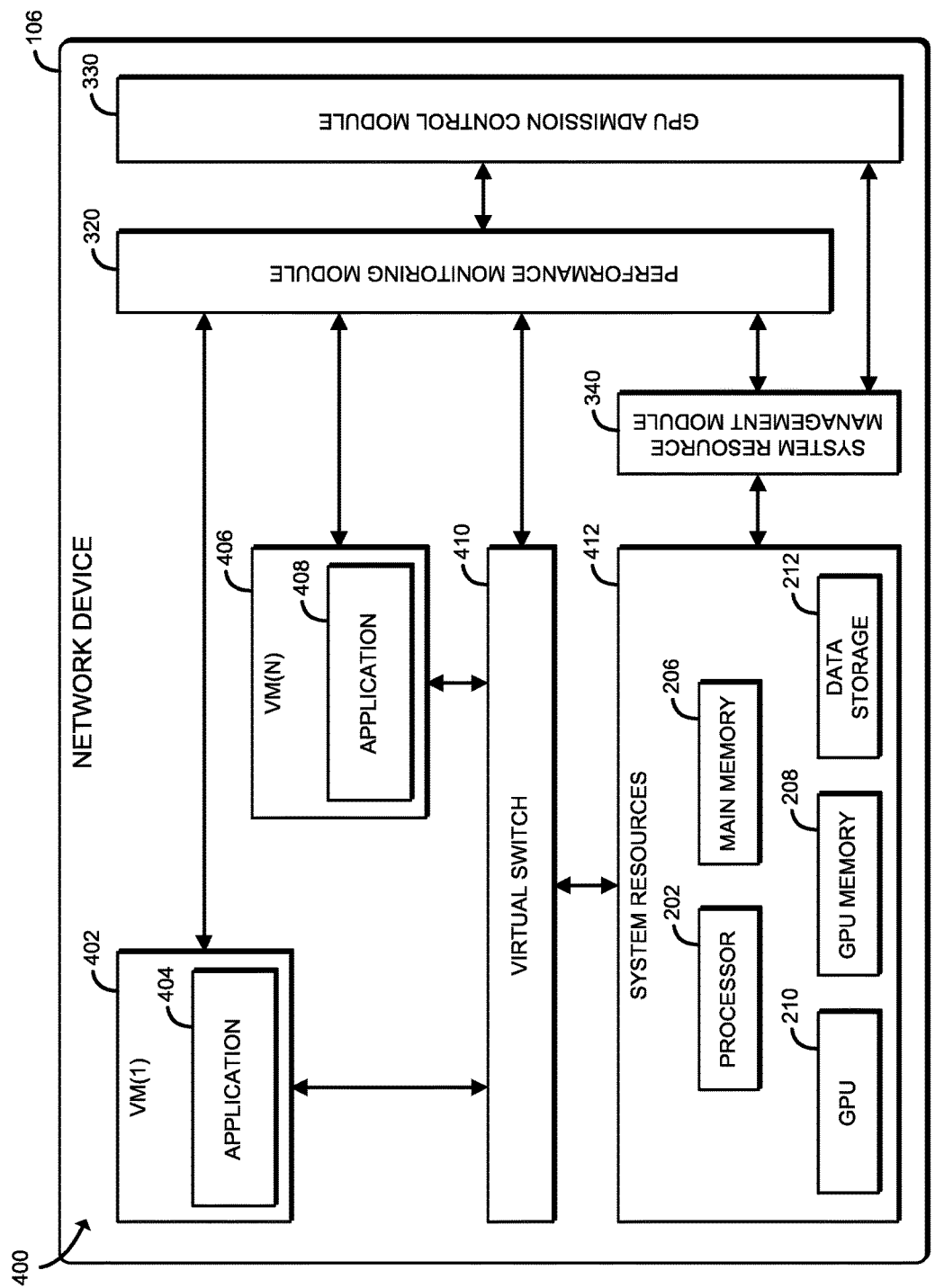
FIG. 4 is a simplified block diagram of another embodiment of an environment that may be established by the network device of FIG. 2.

Referring now to FIG. 4, an operational environment 400 of the network device 106 is shown. The illustrative operational environment 400 includes the performance monitoring module 320, the GPU admission control module 330, and the system resource management module 340 of FIG. 3, as well as a virtual switch 410. In the illustrative operational environment 400, the network device is executing a first virtual machine, which is designated as VM(1) 402, and a second virtual machine, which is designated as VM(N) 406 (i.e., the "Nth" virtual machine running on the network device 106, wherein "N" is a positive integer and designates one or more additional virtual machines running on the network device 106). Each of the VM(1) 402 and the VM(N) 406 include a corresponding application, a first application 404 and an "Nth" application 408, respectively. It should be appreciated that one or more of the VMs 402, 406 may run more than one application. The applications 404, 408 may indicate any type of service or other network processing function presently being performed via the VMs 402, 406 on the network packets, such as a firewall, NAT, load-balancing, DPI, TCP optimization, etc. In some embodiments, the VMs 402, 406 may be configured to function as a service function chain comprised of a number of VMs to perform certain services on the network packets based on various factors, such as type, flow, workload, destination, etc.

The virtual switch 410 may be configured to manage the internal data transfer of network traffic related information. In some embodiments, the performance monitoring module 320 and/or the GPU admission control module 330 may receive mirrored and/or duplicated network packets that are to be processed internally (i.e., the applications 404, 408 running on the local VMs 402, 406). For example, the GPU admission control module 330 may receive a mirrored or duplicated network packet to determine an estimation of the impact processing the network packet may have on a network packet processing application performance metric and/ or a system resource performance metric. Accordingly, the virtual switch 410 may be configured to facilitate the transfer of the mirrored and/or duplicated network traffic between the VMs 402, 406 and the performance monitoring module 320 and/or the GPU admission control module 330.

The illustrative operational environment 400 additionally includes system resources 412 that include the various components of the network device 106, such as the CPU 202, the main memory 206, the GPU memory 208, the GPU 210, and the data storage 212 of FIG. 2. As shown, the system resource management module 340 is communicatively coupled to the system resources 412, such that the system resource management module 340 can manage the system resource and facilitate the transfer of utilization data to the performance monitoring module 320 and the GPU admission control module 330.

Figure 5:
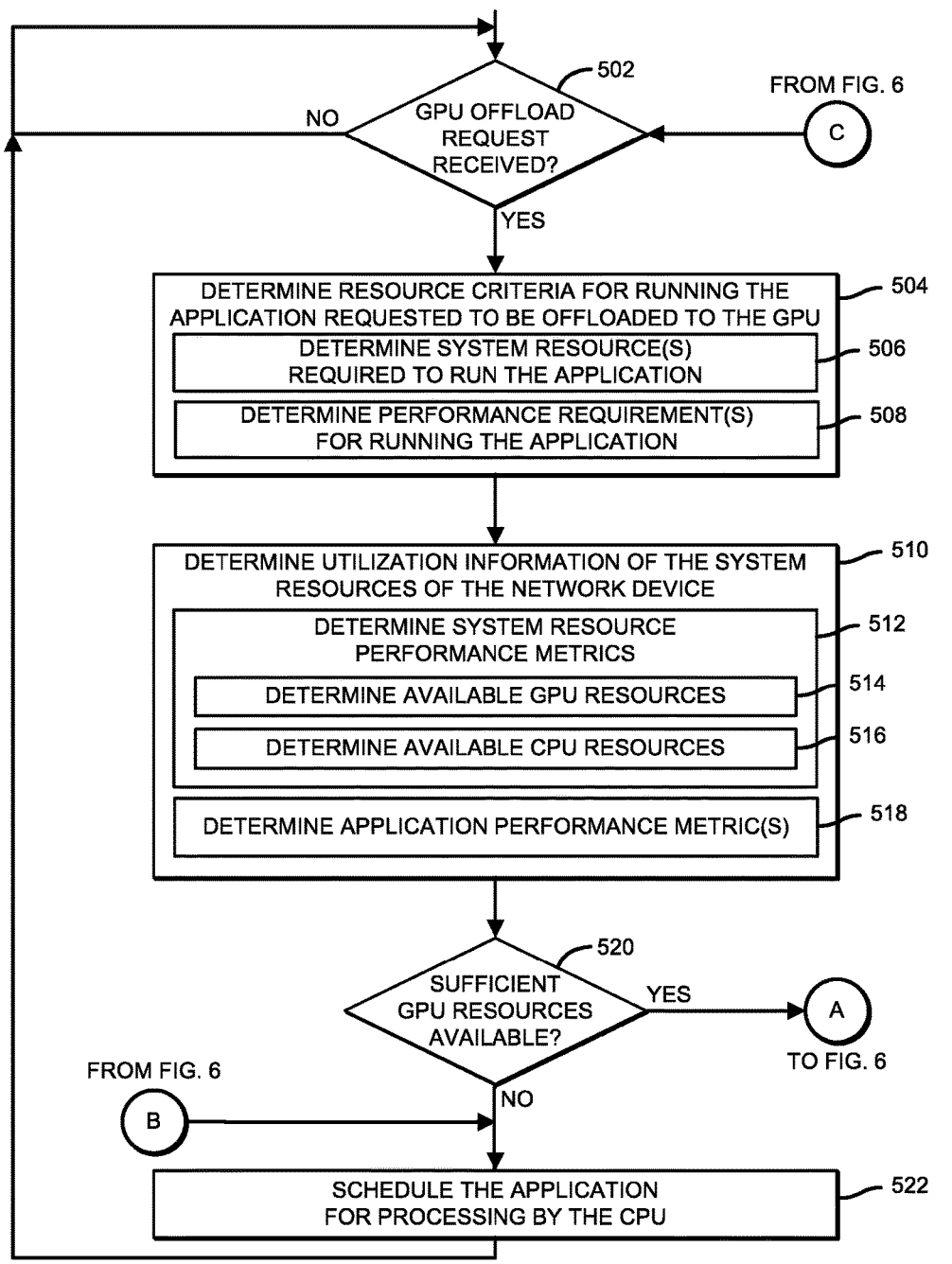
FIGS. 5 and 6 are a simplified flow diagram of at least one embodiment of a method for offloading network packet processing to the GPU of the network device of FIG. 2.
Figure 6:
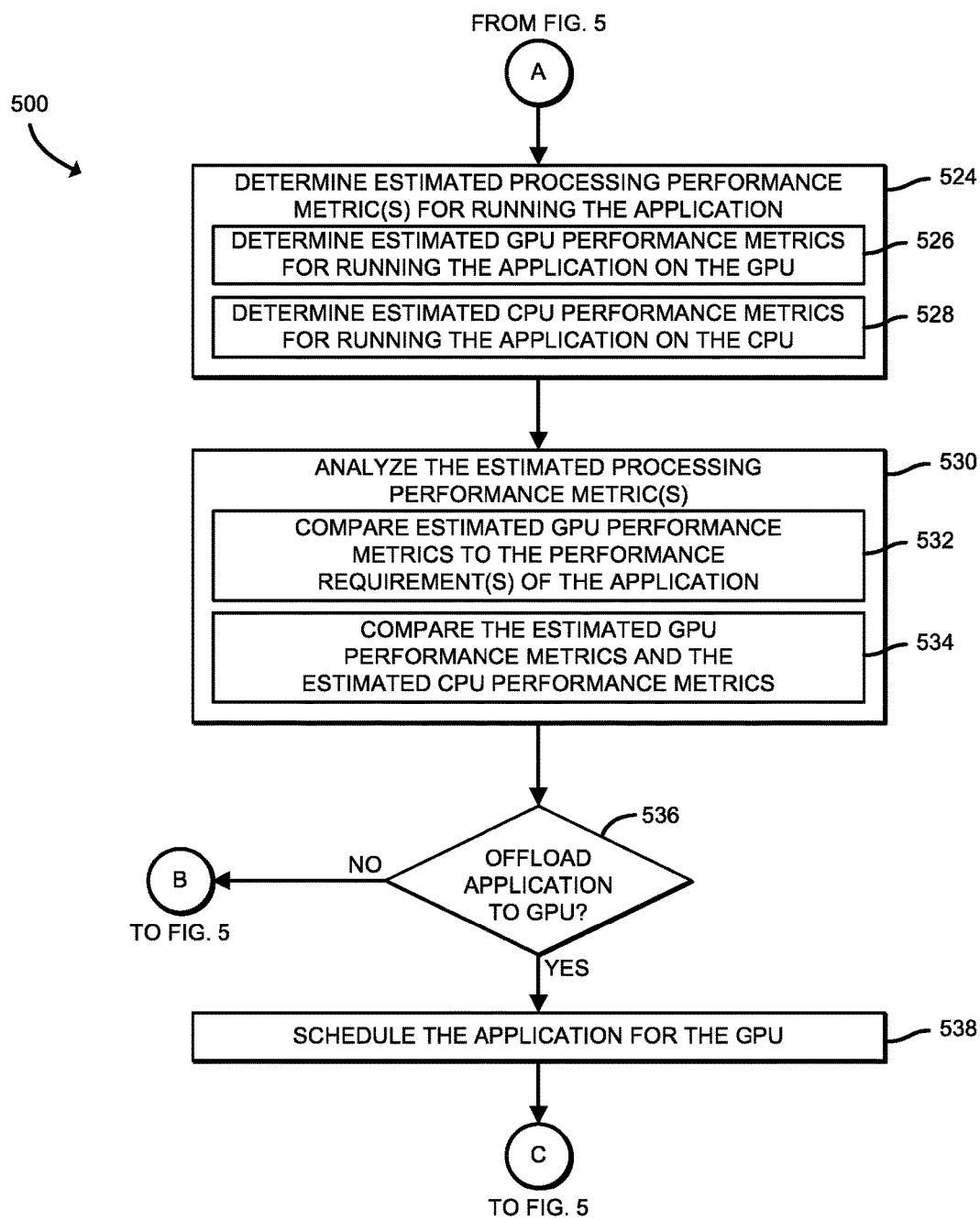

Referring now to FIGS. 5 and 6, in use, the network device 106 may execute a method 500 for offloading network packet processing to a GPU (e.g., the GPU 210) of the network device 106. The method 500 begins with block 502, in which the network device 106 determines whether a GPU offload request was received. In other words, the network device 106 determines whether a network packet processing application is to be offloaded to the GPU 210 (i.e., processed by the GPU 210 rather than the CPU 202). If the network device 106 determines the GPU offload request was not received, the method 500 loops back to block 502 to continue monitoring for the GPU offload request. Otherwise, if the network device 106 determines the GPU offload request was received, the method 500 advances to block 504.

In block 504, the network device 106 determines resource criteria for the network packet processing application to be offloaded to the GPU 210 (i.e., that corresponds to the GPU offload request received at block 502). To do so, in block 506, the network device 106 determines system resources required to run the application. As described previously, the system resources required to run the application may include any data indicative of a minimum or maximum threshold of a system resource required to run the application, such as a minimum amount of memory to allocate, a minimum level of compute power, etc. Additionally, in block 508, the network device 106 determines performance requirements for running the application. As described previously, the performance requirements for running the application may include any data indicative of a minimum or maximum threshold of a performance level when running the application, such as a minimum throughput, a maximum latency, a maximum power consumption level, etc.

In block 510, the network device 106 determines utilization information of the system resources of the network device 106. To do so, in block 512, the network device 106 determines one or more system resource performance metrics. As described previously, the system resource performance metrics may include any data indicative of a utilization or other statistic of one or more physical or virtual components or available resources of the network device 106. The system resource performance metrics may include CPU utilization, GPU utilization, memory utilization, cache hits/misses, GPU thread occupancy, cache miss rate, TLB misses, page faults, etc. From the system resource performance metrics, in block 514, the network device 106 determines available GPU resources, such as a number of available GPU cycles, a number of additional applications that the GPU can run, a GPU frequency, a number of available GPU cores, an amount of available GPU memory 208, etc. Additionally, in block 516, the network device 106 determines available CPU (e.g., the CPU 202 of FIG. 2) resources, such as a number of available cores of the CPU 202, an amount of available cache, a number of processes that can be supported by the CPU 202, an amount of available power of the CPU 202, an amount of available main memory 206, etc. In some embodiments, to determine the available GPU 210 resources in block 514 and the available CPU 202 resources in block 516, the network device 106 may read hardware and/or software performance counters of the network device 106.

In block 518, the network device 106 determines one or more application performance metrics of the network packet processing application that corresponds to the GPU offload request received at block 502. As described previously, the application performance metrics may include a throughput level, a cache usage, a memory usage, a packet processing delay duration, a number of transmitted/received packets, a packet loss/drop count or ratio, a latency level, a power consumption level, etc.

In block 520, the network device 106 determines whether sufficient GPU 210 resources are available to process the application based on the available GPU resources determined in block 514 and the resource criteria for running the application determined in block 504. For example, the network device 106 may determine whether sufficient GPU 210 resources are available to process the application based on a current utilization of the GPU 210, a number of applications presently running on the GPU 210, etc. If not, the method 500 advances to block 522, wherein the network device 106 schedules the application for processing by the CPU 202 before the method return to block 502 to determine whether another GPU offload request was received. Otherwise, if the network device 106 determines there are sufficient GPU 210 resources available to process the application, the method 500 advances to block 524.

In block 524, the network device 106 determines one or more estimated processing performance metrics for running the network packet processing application. To do so, in block 526, the network device 106 determines estimated GPU performance metrics for running the application on the GPU 210. Additionally, in block 528, the network device 106 determines estimated CPU performance metrics for running the application on the CPU 202. The estimated GPU performance metrics determined at block 526 and/or the estimated CPU performance metrics determined at block 528 may include a throughput, a latency, a power consumption, a number of used/available processing cores during running of the application, etc.

In block 530, the network device 106 analyzes the estimated processing performance metrics determined in block 524. To do so, in block 534, the network device 106 compares one or more of the estimated GPU performance metrics to one or more corresponding performance requirements of the application. Additionally, in block 532, the network device 106 compares one or more of the estimated GPU performance metrics against the estimated CPU performance metrics.

In block 536, the network device 106 determines whether to offload the application to the GPU 210 based on at least a portion of the estimated GPU performance metrics, the estimated CPU performance metrics, and the system resource performance metrics. For example, in an embodiment wherein the application has a threshold application performance requirement, such as a maximum latency requirement, one of the estimated GPU performance metrics may be an estimated latency associated with the GPU 210 processing the application. Accordingly, in such an embodiment, if the estimated latency does not meet the maximum latency requirement of the application (i.e., is not less than), the network device may determine the application should be processed by the CPU 202 rather than being offloaded to the GPU 210 for execution. It should be appreciated that "meeting" a threshold application performance requirement may include being greater than or less than the threshold application performance requirement, depending on the threshold application performance requirement being compared.

It should be further appreciated that, in an embodiment wherein the estimated GPU performance metrics meet the threshold application performance requirement and the estimated GPU performance metrics are not determined to be an improvement relative to the CPU performance metrics, the network device 106 may still determine to offload the application to the GPU 210. For example, in such an embodiment wherein performance of the GPU is not impacted such that other applications presently being run on the GPU 210 would no longer meet their respective threshold application performance requirements, freeing up the CPU 202 to perform other tasks may be more beneficial to the network device 106 than scheduling based solely on whether the GPU 210 is estimated to outperform the CPU 202.

If the network device 106 determines not to offload the application to the GPU 210, the method branches to block 522, wherein the network device 106 schedules the application for processing by the CPU 202 before the method return to block 502 to determine whether another GPU offload request was received. Otherwise, if the network device 106 determines to offload the application to the GPU 210, the method 500 advances to block 538, wherein the network device schedules the application for the GPU 210 (i.e., provides an indication to a scheduler of the GPU 210 to schedule the application for processing by the GPU 210).

From block 538, the method 500 loops back to block 502 to determine whether another GPU offload request was received.

EXAMPLES

Illustrative examples of the technologies disclosed herein are provided below. An embodiment of the technologies may include any one or more, and any combination of, the examples described below.

Example 1 includes a network device to offload processing of a network packet to a graphics processing unit (GPU) of a network device, the network device comprising one or more processors; and one or more memory devices having stored therein a plurality of instructions that, when executed by the one or more processors, cause the network device to determine resource criteria of an application, wherein the resource criteria define a minimum amount of one or more system resources of the network device required to run the application; determine available GPU resources of the GPU of the network device; determine whether the available GPU resources are sufficient to process the application based on the resource criteria of the application and the available GPU resources; determine, in response to a determination that the available GPU resources are sufficient to process the application, one or more estimated GPU performance metrics based on the resource criteria of the application and the available GPU resources, wherein the estimated GPU performance metrics indicate an estimated level of performance of the GPU if the GPU were to run the application; and offload processing of the application to the GPU as a function of the one or more estimated GPU performance metrics.

Example 2 includes the subject matter of Example 1, and wherein the one or more memory devices, when executed by the one or more processors, further cause the network device to determine one or more estimated central processing unit (CPU) performance metrics of a CPU of the network device, wherein the estimated CPU performance metrics are determined based on available CPU resources and are indicative of an estimated level of performance of the CPU during a runtime of the application by the CPU; and compare the estimated GPU performance metrics and the estimated CPU performance metrics, and wherein to offload processing of the application to the GPU comprises to offload processing of the application to the GPU in response to a determination that the estimated GPU performance metrics are an improvement relative to the CPU performance metrics.

Example 3 includes the subject matter of any of Examples 1 and 2, and wherein the one or more memory devices, when executed by the one or more processors, further cause the network device to run the processing of the application at the CPU in response to a determination that the estimated GPU performance metrics are an improvement relative to the CPU performance metrics.

Example 4 includes the subject matter of any of Examples 1-3, and wherein the one or more memory devices, when executed by the one or more processors, further cause the network device to determine utilization information for at least a portion of the system resources of the network device, wherein the utilization information is indicative of an amount at which the at least the portion of the system resources are presently utilized, and wherein to determine the one or more estimated GPU performance metrics is further based on the utilization information.

Example 5 includes the subject matter of any of Examples 1-4, and wherein the one or more memory devices, when executed by the one or more processors, further cause the network device to determine whether the estimated GPU performance metrics meet one or more predetermined performance metric thresholds that correspond to at least a portion of the estimated GPU performance metrics, wherein to offload the processing of the application to the GPU comprises to offload the processing of the application to the GPU in response to a determination that the estimated GPU performance metrics meets the predetermined performance metric thresholds.

Example 6 includes the subject matter of any of Examples 1-5, and wherein the one or more memory devices, when executed by the one or more processors, further cause the network device to schedule the processing of the application by a central processing unit (CPU) of the network device in response to a determination that the estimated GPU performance metrics do not meet the predetermined performance metric thresholds.

Example 7 includes the subject matter of any of Examples 1-6, and wherein to determine utilization information for at least a portion of the system resources of the network device comprises to determine at least one of a memory utilization, a command scheduling delay, a cache miss rate, a translation lookaside buffer (TLB) miss, and a page fault.

Example 8 includes the subject matter of any of Examples 1-7, and wherein the application comprises a network packet processing application for processing a network packet received by the network device.

Example 9 includes the subject matter of any of Examples 1-8, and wherein to determine the resource criteria of the application comprises to determine at least one of a minimum amount of memory available to store data related to the application, one or more dependencies of the application, and a minimum number of processing cycles to run the application.

Example 10 includes the subject matter of any of Examples 1-9, and wherein to determine the available GPU resources of the GPU comprises to determine at least one of a number of available cores of the GPU, a number of available cycles of the GPU, a number of total applications supported by the GPU, a number of other applications presently running on the GPU, and a present utilization percentage of the GPU.

Example 11 includes the subject matter of any of Examples 1-10, and wherein to determine the estimated GPU performance metrics comprises to determine at least one of a utilization of a plurality of cores of the GPU, a number of other applications presently running on the GPU, a present performance metric for each of the other applications presently running on the GPU, and a frequency rate of the GPU.

Example 12 includes a method for offloading processing of a network packet to a graphics processing unit (GPU) of a network device, the method comprising determining, by the network device, resource criteria of an application, wherein the resource criteria define a minimum amount of one or more system resources of the network device required to run the application; determining, by the network device, available GPU resources of the GPU of the network device; determining, by the network device, whether the available GPU resources are sufficient to process the application based on the resource criteria of the application and the available GPU resources; determining, by the network device and in response to a determination that the available GPU resources are sufficient to process the application, one or more estimated GPU performance metrics based on the resource criteria of the application and the available GPU resources, wherein the estimated GPU performance metrics indicate an estimated level of performance of the GPU if the GPU were to run the application; and offloading, by the network device, processing of the application to the GPU as a function of the one or more estimated GPU performance metrics.

Example 13 includes the subject matter of Example 12, and further including determining, by the network device, one or more estimated central processing unit (CPU) performance metrics of a CPU of the network device, wherein the estimated CPU performance metrics are determined based on available CPU resources and are indicative of an estimated level of performance of the CPU during a runtime of the application by the CPU; and comparing, by the network device, the estimated GPU performance metrics and the estimated CPU performance metrics, wherein offloading processing of the application to the GPU comprises offloading processing of the application to the GPU in response to a determination that the estimated GPU performance metrics are an improvement relative to the CPU performance metrics.

Example 14 includes the subject matter of any of Examples 12 and 13, and further including scheduling the processing of the application at the CPU in response to a determination that the estimated GPU performance metrics are an improvement relative to the CPU performance metrics.

Example 15 includes the subject matter of any of Examples 12-14, and further including determining, by the network device, utilization information for at least a portion of the system resources of the network device, wherein the utilization information is indicative of an amount at which the at least the portion of the system resources are presently utilized, and wherein the determining the one or more estimated GPU performance metrics is further based on the utilization information.

Example 16 includes the subject matter of any of Examples 12-15, and further including determining, by the network device, whether the estimated GPU performance metrics meets one or more predetermined performance metric thresholds that correspond to each of the estimated GPU performance metrics, wherein offloading the processing of the application to the GPU comprises offloading the processing of the application to the GPU in response to a determination that the estimated GPU performance metrics meets the predetermined performance metric thresholds.

Example 17 includes the subject matter of any of Examples 12-16, and further including scheduling the processing of the application to a central processing unit (CPU) of the network device in response to a determination that the estimated GPU performance metrics do not meet the predetermined performance metric thresholds.

Example 18 includes the subject matter of any of Examples 12-17, and wherein determining utilization information for at least a portion of the system resources of the network device comprises determining at least one of a memory utilization, a command scheduling delay, a cache miss rate, a translation lookaside buffer (TLB) miss, and a page fault.

Example 19 includes the subject matter of any of Examples 12-18, and wherein the application comprises a network packet processing application for processing a network packet received by the network device.

Example 20 includes the subject matter of any of Examples 12-19, and wherein determining the resource criteria of the application comprises determining at least one of a minimum amount of memory available to store data related to the application, one or more dependencies of the application, and a minimum number of processing cycles to run the application.

Example 21 includes the subject matter of any of Examples 12-20, and wherein determining the available GPU resources of the GPU comprises determining at least one of a number of available cores of the GPU, a number of available cycles of the GPU, a number of total applications supported by the GPU, a number of other applications presently running on the GPU, and a present utilization percentage of the GPU.

Example 22 includes the subject matter of any of Examples 12-21, and wherein determining the estimated GPU performance metrics comprises determining at least one of a utilization of a plurality of cores of the GPU, a number of other applications presently running on the GPU, a present performance metric for each of the other applications presently running on the GPU, and a frequency rate of the GPU.

Example 23 includes a computing device comprising a processor; and a memory having stored therein a plurality of instructions that when executed by the processor cause the computing device to perform the method of any of Examples 12-22.

Example 24 includes one or more machine readable storage media comprising a plurality of instructions stored thereon that in response to being executed result in a computing device performing the method of any of Examples 12-22.

Example 25 includes a network device to offload processing of a network packet to a graphics processing unit (GPU) of a network device, the network device comprising a resource criteria determination circuitry to determine resource criteria of an application, wherein the resource criteria define a minimum amount of one or more system resources of the network device required to run the application a performance monitoring circuitry to determine available GPU resources of the GPU of the network device a GPU admission determination circuitry to determine whether the available GPU resources are sufficient to process the application based on the resource criteria of the application and the available GPU resources; and a GPU performance estimation circuitry to determine, in response to a determination that the available GPU resources are sufficient to process the application, one or more estimated GPU performance metrics based on the resource criteria of the application and the available GPU resources, wherein the estimated GPU performance metrics indicate an estimated level of performance of the GPU if the GPU were to run the application, wherein the GPU admission determination circuitry is further to offload processing of the application to the GPU as a function of the one or more estimated GPU performance metrics.

Example 26 includes the subject matter of Example 25, and further including a CPU performance estimation circuitry to determine one or more estimated central processing unit (CPU) performance metrics of a CPU of the network device, wherein the estimated CPU performance metrics are determined based on available CPU resources and are indicative of an estimated level of performance of the CPU during a runtime of the application by the CPU, wherein the GPU admission determination circuitry is further to compare the estimated GPU performance metrics and the estimated CPU performance metrics, and wherein to offload processing of the application to the GPU comprises to offload processing of the application to the GPU in response to a determination that the estimated GPU performance metrics are an improvement relative to the CPU performance metrics.

Example 27 includes the subject matter of any of Examples 25 and 26, and wherein the GPU admission determination circuitry is further to run the processing of the application at the CPU in response to a determination that the estimated GPU performance metrics are an improvement relative to the CPU performance metrics.

Example 28 includes the subject matter of any of Examples 25-27, and wherein the performance monitoring circuitry is further to determine utilization information for at least a portion of the system resources of the network device, wherein the utilization information is indicative of an amount at which the at least the portion of the system resources are presently utilized, and wherein to determine the one or more estimated GPU performance metrics is further based on the utilization information.

Example 29 includes the subject matter of any of Examples 25-28, and wherein the GPU admission determination circuitry is further to determine whether the estimated GPU performance metrics meet one or more predetermined performance metric thresholds that correspond to at least a portion of the estimated GPU performance metrics, wherein to offload the processing of the application to the GPU comprises to offload the processing of the application to the GPU in response to a determination that the estimated GPU performance metrics meets the predetermined performance metric thresholds.

Example 30 includes the subject matter of any of Examples 25-29, and further including a system resource management circuitry to schedule the processing of the application by a central processing unit (CPU) of the network device in response to a determination that the estimated GPU performance metrics do not meet the predetermined performance metric thresholds.

Example 31 includes the subject matter of any of Examples 25-30, and wherein to determine utilization information for at least a portion of the system resources of the network device comprises to determine at least one of a memory utilization, a command scheduling delay, a cache miss rate, a translation lookaside buffer (TLB) miss, and a page fault.

Example 32 includes the subject matter of any of Examples 25-31, and wherein the application comprises a network packet processing application for processing a network packet received by the network device.

Example 33 includes the subject matter of any of Examples 25-32, and wherein to determine the resource criteria of the application comprises to determine at least one of a minimum amount of memory available to store data related to the application, one or more dependencies of the application, and a minimum number of processing cycles to run the application.

Example 34 includes the subject matter of any of Examples 25-33, and wherein to determine the available GPU resources of the GPU comprises to determine at least one of a number of available cores of the GPU, a number of available cycles of the GPU, a number of total applications supported by the GPU, a number of other applications presently running on the GPU, and a present utilization percentage of the GPU.

Example 35 includes the subject matter of any of Examples 25-34, and wherein to determine the estimated GPU performance metrics comprises to determine at least one of a utilization of a plurality of cores of the GPU, a number of other applications presently running on the GPU, a present performance metric for each of the other applications presently running on the GPU, and a frequency rate of the GPU.

Example 36 includes a network device to offload processing of a network packet to a graphics processing unit (GPU) of a network device, the network device comprising means for determining resource criteria of an application, wherein the resource criteria define a minimum amount of one or more system resources of the network device required to run the application; means for determining available GPU resources of the GPU of the network device; means for determining whether the available GPU resources are sufficient to process the application based on the resource criteria of the application and the available GPU resources; means for determining, in response to a determination that the available GPU resources are sufficient to process the application, one or more estimated GPU performance metrics based on the resource criteria of the application and the available GPU resources, wherein the estimated GPU performance metrics indicate an estimated level of performance of the GPU if the GPU were to run the application; and means for offloading processing of the application to the GPU as a function of the one or more estimated GPU performance metrics.

Example 37 includes the subject matter of Example 36, and further including g means for determining one or more estimated central processing unit (CPU) performance metrics of a CPU of the network device, wherein the estimated CPU performance metrics are determined based on available CPU resources and are indicative of an estimated level of performance of the CPU during a runtime of the application by the CPU; and means for comparing the estimated GPU performance metrics and the estimated CPU performance metrics, wherein the means for offloading processing of the application to the GPU comprises means for offloading processing of the application to the GPU in response to a determination that the estimated GPU performance metrics are an improvement relative to the CPU performance metrics.

Example 38 includes the subject matter of any of Examples 36 and 37, and further including means for scheduling the processing of the application at the CPU in response to a determination that the estimated GPU performance metrics are an improvement relative to the CPU performance metrics.

Example 39 includes the subject matter of any of Examples 36-38, and further including means for determining utilization information for at least a portion of the system resources of the network device, wherein the utilization information is indicative of an amount at which the at least the portion of the system resources are presently utilized, and wherein the means for determining the one or more estimated GPU performance metrics is further based on the utilization information.

Example 40 includes the subject matter of any of Examples 36-39, and further including means for determining whether the estimated GPU performance metrics meets one or more predetermined performance metric thresholds that correspond to each of the estimated GPU performance metrics, wherein the means for offloading the processing of the application to the GPU comprises means for offloading the processing of the application to the GPU in response to a determination that the estimated GPU performance metrics meets the predetermined performance metric thresholds.

Example 41 includes the subject matter of any of Examples 36-40, and further including means for scheduling the processing of the application to a central processing unit (CPU) of the network device in response to a determination that the estimated GPU performance metrics do not meet the predetermined performance metric thresholds.

Example 42 includes the subject matter of any of Examples 36-41, and wherein the means for determining utilization information for at least a portion of the system resources of the network device comprises means for determining at least one of a memory utilization, a command scheduling delay, a cache miss rate, a translation lookaside buffer (TLB) miss, and a page fault.

Example 43 includes the subject matter of any of Examples 36-42, and wherein the application comprises a network packet processing application for processing a network packet received by the network device.

Example 44 includes the subject matter of any of Examples 36-43, and wherein the means for determining the resource criteria of the application comprises means for determining at least one of a minimum amount of memory available to store data related to the application, one or more dependencies of the application, and a minimum number of processing cycles to run the application.

Example 45 includes the subject matter of any of Examples 36-44, and wherein the means for determining the available GPU resources of the GPU comprises means for determining at least one of a number of available cores of the GPU, a number of available cycles of the GPU, a number of total applications supported by the GPU, a number of other applications presently running on the GPU, and a present utilization percentage of the GPU.

Example 46 includes the subject matter of any of Examples 36-45, and wherein the means for determining the estimated GPU performance metrics comprises means for determining at least one of a utilization of a plurality of cores of the GPU, a number of other applications presently running on the GPU, a present performance metric for each of the other applications presently running on the GPU, and a frequency rate of the GPU.

The invention claimed is:

1. A network device to offload processing of a network packet to a graphics processing unit (GPU) of the network device, the network device comprising:
one or more processors; and
one or more memory devices having stored therein a plurality of instructions that, when executed by the one or more processors, cause the network device to:
determine resource criteria of an application that is to be offloaded to the GPU prior to the offloading of the application, wherein the resource criteria define a minimum amount of one or more system resources of the network device required to run the application;
determine available GPU resources of the GPU of the network device;
determine whether the available GPU resources are sufficient to process the application based on the resource criteria of the application and the available GPU resources;
determine, in response to a determination that the available GPU resources are sufficient to process the application, one or more estimated GPU performance metrics based on the resource criteria of the application and the available GPU resources prior to the offloading of the application to the GPU, wherein the estimated GPU performance metrics indicate an estimated level of performance of the GPU if the GPU were to run the application; and
offload processing of the application to the GPU as a function of the one or more estimated GPU performance metrics.

2. The network device of claim 1, wherein the one or more memory devices, when executed by the one or more processors, further cause the network device to:
determine one or more estimated central processing unit (CPU) performance metrics of a CPU of the network device, wherein the estimated CPU performance metrics are determined based on available CPU resources and are indicative of an estimated level of performance of the CPU during a runtime of the application by the CPU; and
compare the estimated GPU performance metrics and the estimated CPU performance metrics, and wherein to offload processing of the application to the GPU comprises to offload processing of the application to the GPU in response to a determination that the estimated GPU performance metrics are an improvement relative to the CPU performance metrics.

3. The network device of claim 2, wherein the one or more memory devices, when executed by the one or more processors, further cause the network device to run the processing of the application at the CPU in response to a determination that the estimated GPU performance metrics are an improvement relative to the CPU performance metrics.

4. The network device of claim 1, wherein the one or more memory devices, when executed by the one or more processors, further cause the network device to determine utilization information for at least a portion of the system resources of the network device, wherein the utilization information is indicative of an amount at which the at least the portion of the system resources are presently utilized, and wherein to determine the one or more estimated GPU performance metrics is further based on the utilization information.

5. The network device of claim 4, wherein the one or more memory devices, when executed by the one or more processors, further cause the network device to determine whether the estimated GPU performance metrics meet one or more predetermined performance metric thresholds that correspond to at least a portion of the estimated GPU performance metrics, wherein to offload the processing of the application to the GPU comprises to offload the processing of the application to the GPU in response to a determination that the estimated GPU performance metrics meets the predetermined performance metric thresholds.

6. The network device of claim 5, wherein the one or more memory devices, when executed by the one or more processors, further cause the network device to schedule the processing of the application by a central processing unit (CPU) of the network device in response to a determination that the estimated GPU performance metrics do not meet the predetermined performance metric thresholds.

7. The network device of claim 4, wherein to determine utilization information for at least a portion of the system resources of the network device comprises to determine at least one of a memory utilization, a command scheduling delay, a cache miss rate, a translation lookaside buffer (TLB) miss, and a page fault.

8. The network device of claim 1, wherein the application comprises a network packet processing application for processing the network packet received by the network device.

9. The network device of claim 1, wherein to determine the resource criteria of the application comprises to determine at least one of a minimum amount of memory available to store data related to the application, one or more dependencies of the application, and a minimum number of processing cycles to run the application.

10. The network device of claim 1, wherein to determine the available GPU resources of the GPU comprises to determine at least one of a number of available cores of the GPU, a number of available cycles of the GPU, a number of total applications supported by the GPU, a number of other applications presently running on the GPU, and a present utilization percentage of the GPU.

11. The network device of claim 1, wherein to determine the estimated GPU performance metrics comprises to determine at least one of a utilization of a plurality of cores of the GPU, a number of other applications presently running on the GPU, a present performance metric for each of the other applications presently running on the GPU, and a frequency rate of the GPU.

12. One or more non-transitory computer-readable storage media comprising a plurality of instructions stored thereon that in response to being executed cause a network device to:
determine resource criteria of an application that is to be offloaded to the GPU prior to the offloading of the application, wherein the resource criteria define a minimum amount of one or more system resources of the network device required to run the application;
determine available graphics processing unit (GPU) resources of the GPU of the network device;
determine whether the available GPU resources are sufficient to process the application based on the resource criteria of the application and the available GPU resources;
determine, in response to a determination that the available GPU resources are sufficient to process the application, one or more estimated GPU performance metrics based on the resource criteria of the application and the available GPU resources prior to the offloading of the application to the GPU, wherein the estimated GPU performance metrics indicate an estimated level of performance of the GPU if the GPU were to run the application; and
offload processing of the application to the GPU as a function of the one or more estimated performance metrics.

13. The one or more non-transitory computer-readable storage media of claim 12, further comprising a plurality of instructions that in response to being executed cause the network device to:
determine one or more estimated central processing unit (CPU) performance metrics of a CPU of the network device, wherein the estimated CPU performance metrics are determined based on available CPU resources and are indicative of an estimated level of performance of the CPU during a runtime of the application by the CPU; and
compare the estimated GPU performance metrics and the estimated CPU performance metrics,
wherein to offload processing of the application to the GPU comprises to offload processing of the application to the GPU in response to a determination that the estimated GPU performance metrics are an improvement relative to the CPU performance metrics.

14. The one or more non-transitory computer-readable storage media of claim 13, further comprising a plurality of instructions that in response to being executed cause the network device to schedule the processing of the application at the CPU in response to a determination that the estimated GPU performance metrics are an improvement relative to the CPU performance metrics.

15. The one or more non-transitory computer-readable storage media of claim 12, further comprising a plurality of instructions that in response to being executed cause the network device to determine utilization information for at least a portion of the system resources of the network device, wherein the utilization information is indicative of an amount at which the at least the portion of the system resources are presently utilized, and wherein to determine the one or more estimated GPU performance metrics is further based on the utilization information.

16. The one or more non-transitory computer-readable storage media of claim 15, further comprising a plurality of instructions that in response to being executed cause the network device to determine whether the estimated GPU performance metrics meets one or more predetermined performance metric thresholds that correspond to each of the estimated GPU performance metrics, wherein to offload the processing of the application to the GPU comprises to offload the processing of the application to the GPU in response to a determination that the estimated GPU performance metrics meets the predetermined performance metric thresholds.

17. The one or more non-transitory computer-readable storage media of claim 16, further comprising a plurality of instructions that in response to being executed cause the network device to schedule the processing of the application to a central processing unit (CPU) of the network device in response to a determination that the estimated GPU performance metrics do not meet the predetermined performance metric thresholds.

18. The one or more non-transitory computer-readable storage media of claim 15, wherein to determine utilization information for at least a portion of the system resources of the network device comprises to determine at least one of a memory utilization, a command scheduling delay, a cache miss rate, a translation lookaside buffer (TLB) miss, and a page fault.

19. The one or more non-transitory computer-readable storage media of claim 12, wherein the application comprises a network packet processing application for processing a network packet received by the network device.

20. The one or more non-transitory computer-readable storage media of claim 12, wherein to determine the resource criteria of the application comprises to determine at least one of a minimum amount of memory available to store data related to the application, one or more dependencies of the application, and a minimum number of processing cycles to run the application.

21. The one or more non-transitory computer-readable storage media of claim 12, wherein to determine the available GPU resources of the GPU comprises to determine at least one of a number of available cores of the GPU, a number of available cycles of the GPU, a number of total applications supported by the GPU, a number of other applications presently running on the GPU, and a present utilization percentage of the GPU.

22. The one or more non-transitory computer-readable storage media of claim 12, wherein to determine the estimated GPU performance metrics comprises to determine at least one of a utilization of a plurality of cores of the GPU, a number of other applications presently running on the GPU, a present performance metric for each of the other applications presently running on the GPU, and a frequency rate of the GPU.

23. A method for offloading processing of a network packet to a graphics processing unit (GPU) of a network device, the method comprising:

determining, by the network device, resource criteria of an application that is to be offloaded to the GPU prior to the offloading of the application, wherein the resource criteria define a minimum amount of one or more system resources of the network device required to run the application;

determining, by the network device, available GPU resources of the GPU of the network device;

determining, by the network device, whether the available GPU resources are sufficient to process the application based on the resource criteria of the application and the available GPU resources;

determining, by the network device and in response to a determination that the available GPU resources are sufficient to process the application, one or more estimated GPU performance metrics based on the resource criteria of the application and the available GPU resources prior to the offloading of the application to the GPU, wherein the estimated GPU performance metrics indicate an estimated level of performance of the GPU if the GPU were to run the application; and offloading, by the network device, processing of the application to the GPU as a function of the one or more estimated performance metrics.

24. The method of claim 23, further comprising:

determining, by the network device, one or more estimated central processing unit (CPU) performance metrics of a CPU of the network device, wherein the estimated CPU performance metrics are determined based on available CPU resources and are indicative of an estimated level of performance of the CPU during a runtime of the application by the CPU; and comparing, by the network device, the estimated GPU performance metrics and the estimated CPU performance metrics, wherein offloading processing of the application to the GPU comprises offloading processing of the application to the GPU in response to a determination that the estimated GPU performance metrics are an improvement relative to the CPU performance metrics.

25. The method of claim 24, further comprising scheduling the processing of the application at the CPU in response to a determination that the estimated GPU performance metrics are an improvement relative to the CPU performance metrics.

* * * * *